UNITED STATES PATENT OFFICE.

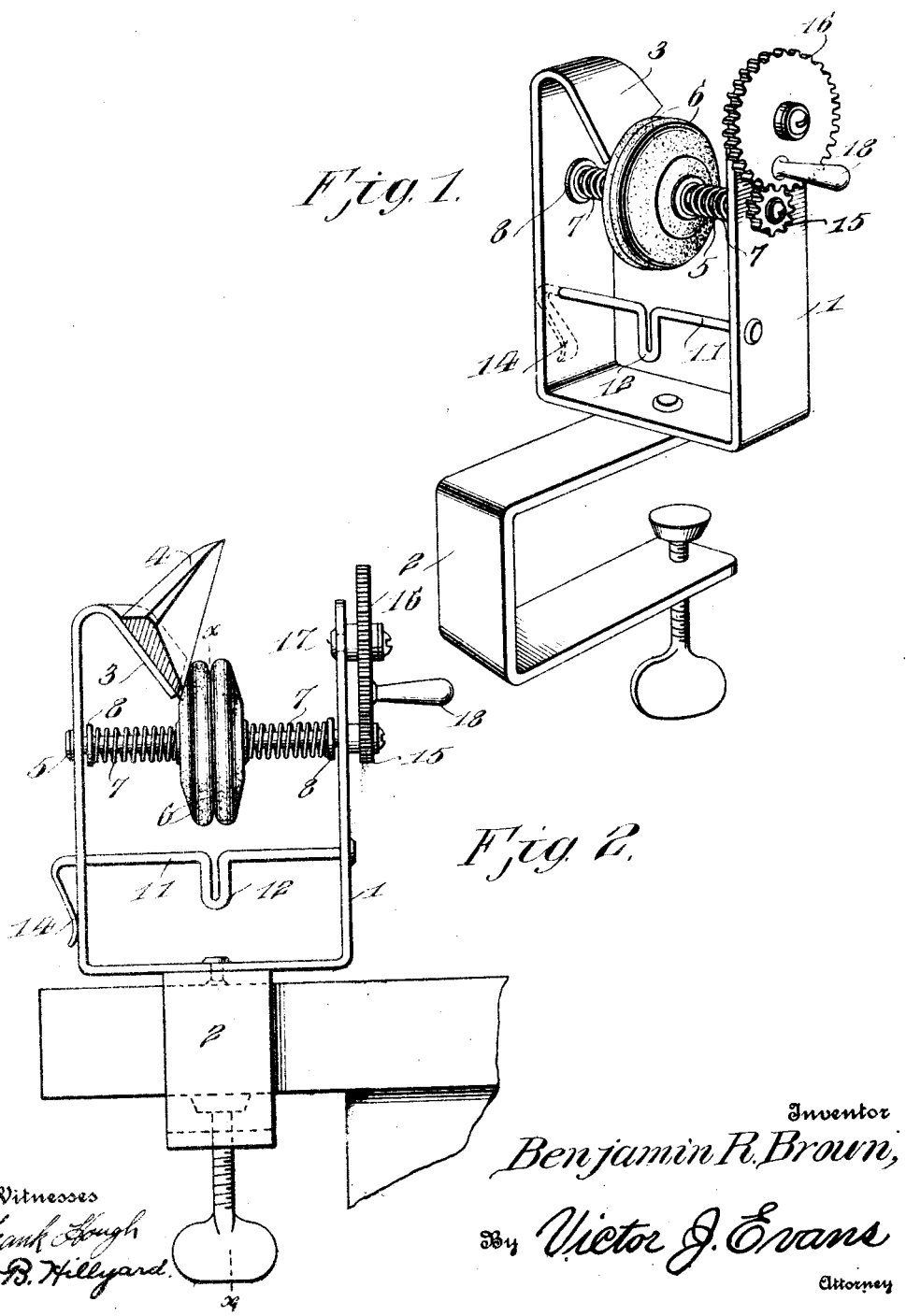

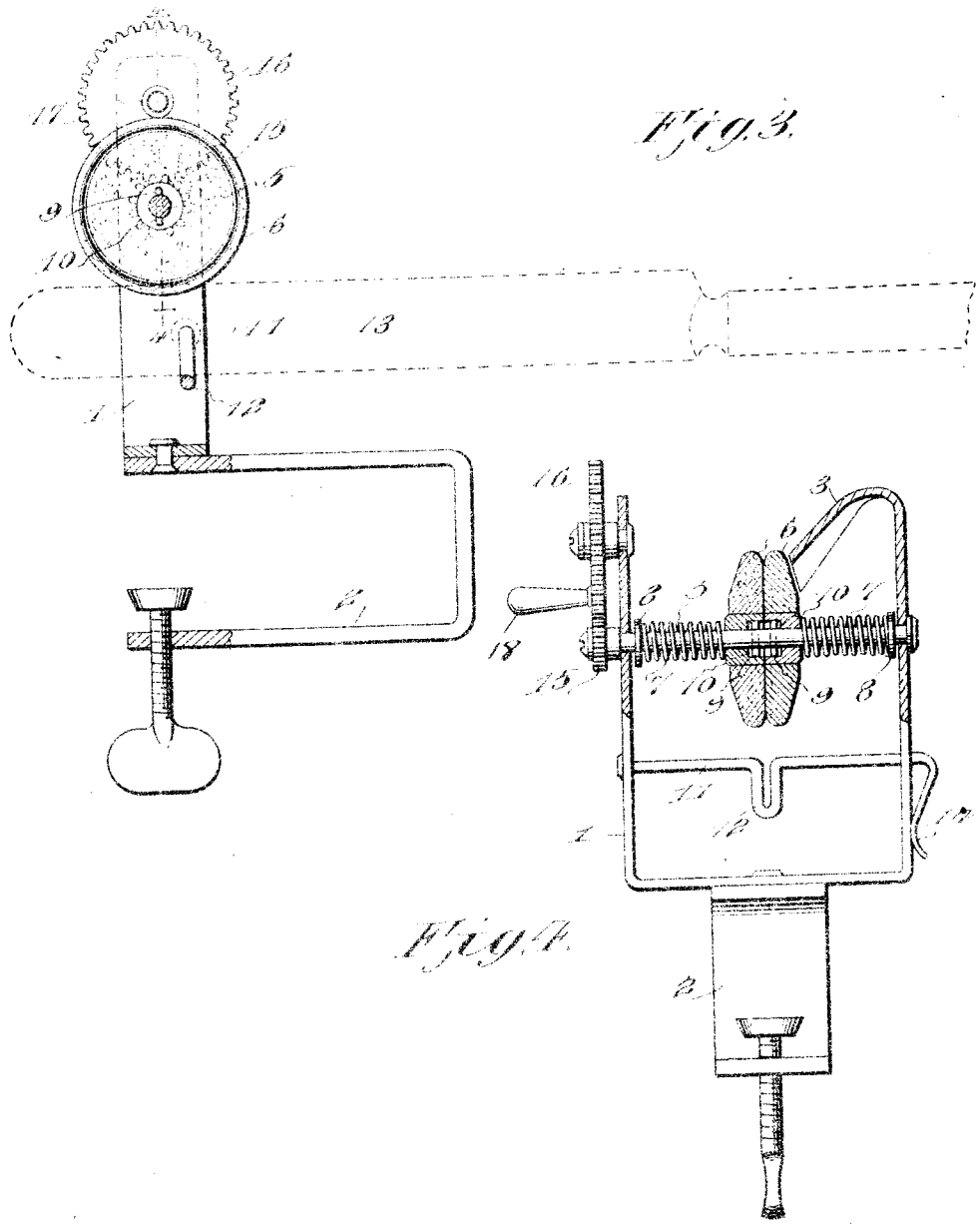

BENJAMIN R. BROWN, OF CHILHOWEE, MISSOURI.

GRINDING-MACHINE.

1,068,973.  Specification of Letters Patent.  Patented July 29, 1913.

Application filed August 27, 1912. Serial No. 717,333.

*To all whom it may concern:*

Be it known that I, BENJAMIN R. BROWN, a citizen of the United States, residing at Chilhowee, in the county of Johnson and State of Missouri, have invented new and useful Improvements in Grinding-Machines, of which the following is a specification.

The present invention provides a machine particularly adapted for household use, for sharpening cutlery, scissors and shears.

The invention provides a machine which may be easily and quickly attached to a table, shelf or other support, and which is specially adapted for sharpening knives and shears, a guide being supplied to hold either a knife or the shear blade in proper position during the grinding or sharpening operation.

The invention has relation to a machine of the character hereinbefore stated which is simple in its general structure and embodies two grinding wheels which are spring pressed so as to automatically hold the grinding wheels in engagement with the surface of the blade to be sharpened.

The invention consists of the novel features, details of construction and combination of parts, which hereinafter will be more particularly set forth, illustrated in the accompanying drawings, and pointed out in the appended claim.

Referring to the drawings, forming a part of the specification, Figure 1 is a perspective view of a combined knife and shear grinding machine embodying the invention. Fig. 2 is a front view of the machine, showing a shear blade in position for grinding. Fig. 3 is a section on the line $x$—$x$ of Fig. 2, showing a knife in position. Fig. 4 is a section of the machine at right angles to Fig. 3, the shaft and gearing being in full lines.

Corresponding and like parts are referred to in the following description, and indicated in all the views of the drawings, by the same reference characters.

The machine embodies a U shaped frame 1, which may be of any construction and which has its lower horizontal bar provided with a clamp 2 for securing the machine to a table, shelf or other means of support. One of the upright or side members of the frame has its upper end bent inwardly, as shown at 3, to provide a guide or holder for a shear blade 4. The bent end 3 inclines inwardly as well as transversely so that the shear blade may occupy a position at an angle to the horizontal, which is most convenient for grinding. A shaft 5 is journaled at its ends in the upright or side members of the frame 1 and receives a pair of grinding wheels 6, which are pressed inwardly toward each other by means of springs 7 mounted upon end portions of the shaft 5 and confined between the grinding wheels and washers 8. The springs 7 are expansible and normally exert a pressure to force the grinding wheels toward each other, thereby automatically advancing them to the work. Pins 9 are let into openings formed in the shaft 5 and are adapted to enter openings 10 formed in the inner faces of the grinding wheel 6. These pins cause the grinding wheels to rotate with the shaft 5. The openings 10 are of a depth to admit of a limited movement of the grinding wheels upon the shaft so that blades of varying thickness may be introduced between the grinding wheels.

A blade holder is located below the shaft 5 and consists of a rod 11 mounted at its ends in the uprights or side members of the frame 1. A crimp or loop 12 is formed in the rod 11 in line with the space formed between the grinding wheels. This crimp or loop 12 receives the back portion of the blade 13 to be sharpened or ground, whereas the edge portion of such blade is introduced between the grinding wheels. The crimp or loop 12 fixes the position of the blade. An end portion of the rod 11 is extended and bent, as indicated at 14, to provide an arm which may be grasped when it is required to turn the rod 11 so as to change the inclination of the crimp or loop 12, whereby the blade holder may be adapted for knives of varying widths. The arm 14 possesses a spring action and engages the adjacent upright of the frame 1 to hold the rod 11 in the required position.

The shaft 5 may be rotated in any manner and in order that the grinding wheels may be driven at a high speed a pinion 15 is secured to a projecting end of the shaft and is in mesh with a gear wheel 16 mounted upon a stud 17 and having a handle 18.

The machine when not required for immediate use may be laid aside and when required for service may be easily attached to a table, projecting ledge or shelf by means of the clamp 2.

When a pair of scissors or shears is to be sharpened a blade thereof is placed upon the holder 3 with its edge in contact with the adjacent grinding wheel 6 and upon turning the handle 18 the grinding wheels are rotated and sharpen the blade, which latter is moved upon the holder 3 so as to remain squarely thereon at all times with its edge in contact with the grinding wheel. Should the article to be sharpened consist of a knife blade the latter is placed with its back in the crimp or loop 12 of the blade holder and with its edge portion between the grinding wheels, which latter are rotated in the manner stated, the blade being moved backward and forward to bring every portion of the edge in position to be properly ground.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative and that such changes may be made when desired as are within the scope of the claim appended hereto.

Having thus described the invention what is claimed as new, is:—

In a machine of the character described comprising a U shaped frame having a clamp fitted to the horizontal bar and having the upper end of a side member inwardly bent, a shaft mounted in the side members of the frame, a pinion secured to an end of the shaft which projects beyond the frame, a gear wheel mounted upon the side member of the frame opposite to that having the inwardly bent end, said gear wheel being in mesh with the pinion and provided with an operating handle, grinding wheels mounted upon the shaft and having their inner faces recessed, pins set into the shaft and adapted to engage the grinding wheels to cause them to rotate with the shaft and to limit their inward movement, expansible springs mounted upon opposite end portions of the shaft between the grinding wheels and side members of the frame, and a rod mounted in the side members of the frame and provided at a central point with a blade holder.

In testimony whereof I affix my signature in presence of two witnesses.

BENJAMIN R. BROWN.

Witnesses:
R. E. SWEENEY,
STANLEY McELWEE.